3,672,910
BLOOD PRODUCT FOR FISH BAIT
R. D. Moore, Jacksonville, Tex., assignor to R-J-R, Corp.
No Drawing. Filed June 8, 1970, Ser. No. 44,646
Int. Cl. A01n 17/14
U.S. Cl. 99—3                                              2 Claims

ABSTRACT OF THE DISCLOSURE

A manufactured fish bait made from fresh warm animal blood by mixing a gelling agent with the warm blood, permitting the mixture to solidify, draining and air drying the resulting product, and suitably packaging the blood product for subsequent use as a fish bait. Where deemed desirable, the product can be improved by the addition of anise, charcoal, sodium chloride, and sodium bicarbonate.

BACKGROUND OF THE INVENTION

Once upon a time the amateur fisherman depended almost wholly upon worms for a convenient and reliable bait. In recent times, a new field of endeavor has evolved which is based upon the manufacture of various artificial or man-made baits for the week-end fisherman. Of these products, some fisherman prefer artificial lures and other realistically fabricated life-like plastic minnows, worms, frogs, etc. Others are old fashioned and still prefer to purchase expensive live bait or frozen shrimp and the like. Still others prefer the use of a consumable artificial bait, as for example, blood bait.

Most consumable artificial bait is of a doughy or pasty consistency which is marketed in jars or the like. The greatest objection to this type man-made bait is its obnoxious odor. Such a bait is messy and offensive to handle, difficult to make adhere to a fishhook, and contaminates the fisherman's hands with its putrid odor, even after washing. The stench produced in the tackle box by some artificial bait brings about the undesirable practice of the more effluent fisherman simply cutting away his hooks and disposing of them rather than to return them to storage in the closed tackle box.

Therefore, it is desirable to provide a manufactured blood bait which has no obnoxious odor, is more agreeable to handle, more readily adheres to the fish hook, and leaves no odorous residue clinging to the fisherman's hands. It is desirable to provide a manufactured bait which is inexpensively packaged, convenient to store and carry, easily cut into a convenient size, is more pleasing to look upon, and which remains usable for a reasonable length of time. It is also desirable that such a bait below in cost to manufacture and absolutely irresistible to the fish.

SUMMARY OF THE INVENTION

This invention comprehends the manufacture of an improved blood product for use as a fish bait which is compirsed of a mixture of fresh warm animal blood and a suitable gelling agent together with a mixture of anise, sodium chloride, sodium bicarbonate, and charcoal powder. The improved bait is manufactured by mixing these ingredients together, permitting the gelled mass to solidify, and packing the resultant product in a suitable container to provide convenient strips of bait for use in catching fish.

A primary object of the present invention is to provide an improved manufactured fish bait which is convenient to handle and which is efficient in catching fish with a baited hook.

Another object of the present invention is the provision of a manufactured bait which can be carried outdoors and used for several days without undergoing undue spoilage.

A still further object of the present invention is the provision of an improved attractive consumable bait for baiting fish hooks which is low in cost to produce, pleasing to look upon, and which will attract most species of game fish.

A still further object of the present invention is the provision of an improved blood bait comprised of a gelatinous suspension of fresh animal blood which is treated in a manner to enable it to be stored under low temperature conditions until needed.

The above objects are attained in accordance with the present invention by the provision of an improved fish bait which is manufactured essentially as outlined in the above abstract and summary. Various other objects and advantages of this invention will become readily apparent to those skilled in the art upon reading the following detailed description, examples of manufacture methods, and claims.

DETAILED DESCRIPTION OF THE PREFERRED EMBODIMENT

In carrying out the present invention, it is essential that a suitable supply of fresh animal blood, preferably beef blood such as found associated with the slaughtering of beeves and the like, be readily available. The various ingredients of the bait must be mixed together and with the warm blood prior to the natural coagulation of the blood being effected. In addition to the supply of fresh animal blood, it is preferred that the following ingredients be made available in a form whereby they can be conveniently and rapidly admixed prior to utilization of the fresh blood supply: anise; charcoal powder; sodium chloride; sodium bicarbonate; and a suitable gelling agent such as gelatin.

Anise is an oil which is extracted from a plant seed, and particularly the anise plant. The oil has a fragrant pungent taste, and sometime is used to flavor a cordial. As used herein, the term "anise" is intended to include other seed oils having similar characteristics to the anise plant. Those skilled in the art, by experimentation, and having viewed this disclosure, will understand how to substitute similar seed oils for anise.

The charcoal powder or activated charcoal, is of a commercial grade and absorbs unpleasant odors.

The sodium chloride is common table salt (NaCl) which may be a commercial grade, and which acts as a preservative wih respect to the organic solid matter present in the blood.

The sodium bicarbonate ($NaHCO_3$), also called baking soda, is of a commercial grade and is present in order to react with and neutralize any acids which may be naturally present or subsequently formed in the product.

The gelling agent is preferably a protein derived from animal matter called "gelatin," and preferably is the usual gelatin employed in cooking. Other gelatins can be satisfactorily used as the gelling agent, so long as the resultant characteristics of the fish bait remain essentially as described herein. One source of a suitable gelling agent is "Knox Unflavored Gelatine" manufactured by Knox Gelatine, Inc., Johnstown, N.Y. An analysis of this particular gelatin is: protein 85–87%; moisture 12–14%; ash 1.0–1.2%; fat 0; sodium 90 mg./100 gm.

Gelatin swells to many times its normal volume in salt solutions, depending upon the pH of the solution. Since it acts as an emulsoid colloid it has a protective action which inhibits the precipitation of salts and avoids flocculation of other colloids. It also prevents formation of large ice crystals in the bait when stored under freezing temperatures, and adds considerable body to the thawed bait. The gelatin is, of course, the most essential component which is added to the fresh blood for for making the fish bait.

Beef blood contains about 10% solids in the form of proteins and salt with traces of fat and acids. For this reason the salt can be left out of the above listed ingredients, however, the NaHCO$_3$ is preferably added to the mixture since it acts to neutralize the uric acid present in small amounts in the blood. The fibrinogen of the blood causes natural clotting to occur along with the gelling action, and the red pigment of the corpuscles impart an attractive deep color into the bait.

The foregoing ingredients are mixed together in the following volume ratio: one part anise; four parts charcoal powder; four parts finely divided sodium chloride; six parts gelling agent; and eight parts finely divided sodium bicarbonate. Twelve ounces of the above ingredients are mixed together with four ounces of water and placed into the bottom of a suitable five gallon container. The container is then filled with fresh warm animal blood from a freshly slaughtered steer, and allowed to set until the mass of coagulated material is self supporting. The container is then inverted, the material slidably removed therefrom and lightly salted, after which it is allowed to drain and air dry for twenty-four hours. The gelled and coagulated material is self supporting and may be cut into thin strips approximately one-half inch in thickness and three inches in length, placed into a suitable cardboard container, and then subjected to a storage temperature of approximately —15° F.

When the material is to be used as fish bait, it is removed from the low temperature storage area and carried to the fishing site. The blood bait material is usable for two-to-five days, depending upon ambient temperature conditions during that time. Of course, storage of the bait in a cooler environment will significantly delay spoilage.

In using the bait, a strip of it is preferably laid out in a convenient location, such as one the seat or floor of a boat, and cut into smaller pieces, as necessary, to be conviently accommodated upon the particular size hook being used. The bait improves in texture as it further air dries in the sun and will assume no appreciable obnoxious odor over a long week-end of usage.

When manufacture of a small quantity of bait is desired, the following example has been found to work satisfactorily: four tablespoons of baking soda, three tablespoons of gelatin, two tablespoons of salt, two tablespoons of charcoal powder, and one-half tablespoon of anise are mixed together with one-half cup water and placed in the bottom of a container. Two-to-eight gallons of fresh warm beef blood are run into the container and the gelling action immediately commences. In less than one hour the container can be inverted and lifted from the self-supporting coagulated mass. The material is lightly salted and left to drain and air dry overnight. The following day the mass can be cut into convenient size pieces, suitably packaged, and stored in a low temperature environment until needed.

As an example of manufacture of a large quantity of the product, the following volume ratios were mixed together, subdivided into sixteen equal portions, and placed into the bottom of sixtten different fifteen gallon containers: eight quarts baking soda; six quarts gelatin; four quarts common table salt; four quarts activated carbon; and one quart anise. Ten gallons of fresh beef blood was poured into each of the containers, and after fifty minutes each container was inverted and removed, exposing the gelled mass. The gelled mass was then lightly salted and left to dry or cure for twenty-four hours under good ventilated conditions. Each mass was cut into strips, again lightly salted, and packaged for low temperature storage and subsequent shipment.

While it is possible to attain a self supporting coagulated mass suitable for use as fish bait by leaving the charcoal powder out of the mixture, it is believed that the resultant substance is inferior in quality to the above disclosed bait. Likewise, the anise can be omitted from the mixture, however, such a bait is less effective in attracting fish into the vicinity of the fisherman's hook.

The sodium chloride is considered necessary only to enhance the appearance and retard spoilage. The sodium bicarbonate is believed to react with the uric acid of the blood and various other acids which would otherwise be subsequently produced by chemical reactions within the mixture, causing an unpleasant odor to occur.

Those skilled in the art will realize that immediately upon mixing the blood with the various ingredients, the mixture could be poured into smaller individual molds and allowed to gel therein by using equipment which would permit this operation to be carried out before substantial gelling action occurred. It is preferred, however, to prepare larger quantities of bait and slice it into attractive thin slices. The surface of the individually salted and packaged sliced bait is deep ruby red in color and remains attractive in appearance for several days. The unused bait can be refrozen and used again.

Fishing bait made in accordance with the present invention is low in manufacturing cost, agreeable to handle, attractive in appearance, easily stored and handled in an average fishing boat, has no unpleasant odor, and is absolutely irresistible to most game fish.

I claim:
1. Manufactured fish bait comprising:
   (1) mixing together, by volume, one part anise, four parts sodium chloride, four parts charcoal powder, and eight parts sodium bicarbonate to six pars of the gelling agent to provide six to eighteen ounces of material which is added to five gallons of fresh animal blood to cause a gelatinous suspension of the solid material contained within the blood to occur;
   (2) allowing the gelled blood to drain and air dry;
   (3) storing the product in a suitable container until needed.
2. The fish bait of claim 1 and further including cutting the bait into strips and salting the individual strips prior to packaging, and subjecting the bait to a low temperature environment for several days prior to its usage.

References Cited
UNITED STATES PATENTS

| | | | |
|---|---|---|---|
| 306,896 | 10/1884 | Bates | 99—3 |
| 688,604 | 12/1901 | Dietrich et al. | 260—121 |
| 1,742,956 | 1/1930 | Green | 99—3 |
| 2,583,964 | 1/1952 | Otter | 99—3 X |
| 2,631,937 | 3/1953 | Buss | 99—3 |

FOREIGN PATENTS

| | | | |
|---|---|---|---|
| 95,894 | 4/1960 | Norway | 99—3 |

NORMAN YUDKOFF, Primary Examiner

K. VAN WYCK, Assistant Examiner

U.S. Cl. X.R.

99—21